Patented Feb. 9, 1943

2,310,424

UNITED STATES PATENT OFFICE 2,310,424

LUMINESCENT COMPOSITION AND METHOD OF PRODUCING THE SAME

Mac Goodman, New York, N. Y.

No Drawing. Application May 23, 1940, Serial No. 336,881

5 Claims. (Cl. 250—81)

This invention relates to improvements in luminescent compositions and methods of producing the same, being particularly directed to fluorescent and phosphorescent zinc sulphide products.

Up to the present time, luminescent compositions of the zinc sulphide class have been produced in the main by calcining chemically pure zinc sulphide or mixtures of zinc and other sulphides, the metal constituent of which is in the second periodic group, and all of which sulphides are not normally luminescent, with relatively minute quantities of heavy metal salts or finely powdered heavy metals known as phosphorogens and serving as activators, together with alkali salts known as luminophors and serving as fluxes; in some cases salts incorporating barium, strontium and the like have been added to vary the emission color of the resulting luminescent composition.

In the course of the aforesaid calcination, the phosphorogen molecules of the heavy metal salts or atoms of heavy metals are introduced by occlusion into the random interstices of the lattices of the zinc sulphide crystals as they develop in calcination. It is generally held that such occlusions form complex centers in the crystal lattice, in which originate the phenomena of luminescence. The phosphorogens occluded in this manner during and as a result of the calcination have no appreciable gross physical effect on the zinc sulphide crystal or the lattice formation thereof. Upon the input of energy as, for example, electro-magnetic disturbances such as light, whether artificial or natural, the phosphorogen electrons are displaced from their regular orbital positions in the vicinity of the complex center and its metallic atom within the voids or interstices of the zinc sulphide crystal lattices, and upon withdrawal of the aforesaid input energy such electrons return from their displaced to their original orbital position at a rate which is more or less rapid, and by such movement produce luminescence either in the nature of fluorescence or phosphorescence, as the case may be.

In general, therefore, in the prior practices luminescence is developed in the end product, zinc sulphide, by calcining the identical composition zinc sulphide as the reaction product with minute quantities of metals and salts which are thereby physically dispersed into the random voids or interstices of the crystal lattices of the end product as they develop, the resulting conformation and structure of the end product crystal being essentially that which would be produced by calcination of zinc sulphide per se or with any non-chemically reactive ingredient.

My method differs from that of the prior art both in its chemical and physical aspects and involves primarily the formation of a luminescent end product having properties of fluorescence or phosphorescence as the case may be, without the inclusion of phosphorogens. I ignite as reaction products zinc oxide and sulphur in stoichiometric proportions in a non-oxidizing atmosphere to produce as an end product a zinc sulphide incorporating zinc oxide in solid solution. Not all of the zinc oxide reacts with the sulphur. During the formation of the end product both in the reaction and cooling periods the unreacted zinc oxide is occluded in the zinc sulphide crystal being formed and thus causes a predetermined and appreciable distortion of the respective lattices of such crystal, in the voids or interstices of which are occluded the zinc oxide molecules.

The solid solutions of zinc oxide in zinc sulphide as they are chemically and physically developed during the calcination of the zinc oxide and sulphur are distributed more or less uniformly in the voids and interstices of the respective lattices of the end product crystal. Since in my process the reaction progresses uniformly throughout the entire mass undergoing calcination, the lattices of the crystals being built up not only incorporate the random voids and interstices normally developed in the formation of a crystal during calcination, but develop distortions in the lattice to a considerable extent by virtue of the presence of the homogeneously distributed unreacted zinc oxide molecules in the lattice layers progressively being developed in the crystals. Such unreacted zinc oxide molecules not otherwise occluded in the normal random voids and interstices of the lattices as the same are being built up cause distortions in the crystal lattices by forming solid solutions in the same, because the inter-nuclear distances of the zinc oxide molecules differ from those of the zinc sulphide molecules and thus cause disarrangement of the normal lattice architecture. In my end product, namely, zinc sulphide carrying zinc oxide in solid solution, the crystal formation is therefore substantially different in constitution, lattice architecture, and facial angles as compared with the properties of the zinc sulphide crystal calcined for luminescence under the processes heretofore used in the art.

With respect to the aforesaid calcination in accordance with my method, if the reaction products, zinc oxide and sulphur, are ignited at temperatures in the range of 1100° C. for a relatively short period of between one-quarter to one-half hour, such temperature range being just above the transition from the beta to the alpha form of zinc sulphide, the end product is a hard pulverulent mass of fine crystals, tannish white by daylight, and brilliantly light green under the ultra-violet light; upon increasing the period of ignition of the aforesaid reaction products, zinc oxide and sulphur, to about an hour, and raising the temperature range to between 1200° to 1350° C., the resulting product is essentially pale yellow by daylight and predominantly green under ultra-violet, this last named end product having a strong and long continued after-emission upon removal of the exciting energy source.

These and other advantages, capabilities and features of the invention will appear from the subjoined detailed description of one specific embodiment thereof.

In carrying out my process, I intimately mix pure zinc oxide and pure crystallized sulphur or flowers of sulphur in stoichiometric proportions as, for example, my ignition mixture may comprise 81 parts of zinc oxide and 48 parts of flowers of sulphur. I heat the resulting mixture in a non-oxidizing atmosphere at a temperature of about 1100° C. for a half hour, after which the end product is cooled rapidly and ground. This product is of tannish white coloration and develops a light green fluorescence under excitation by ultra-violet radiation but no after-emission upon removal of the excitation source.

To form a phosphorescent composition in accordance with my process I take the same proportions of zinc oxide and sulphur, as in the previous example, and increase both the temperature range and time of ignition, so that the reaction takes place for approximately between an hour and an hour and a half, and the temperature of ignition is between 1250° and 1350° C. The end product after ignition is rapidly cooled and ground. The end product is pale yellow in ordinary light and under ultra-violet light is brilliant light green in coloration and has an after-emissivity for a considerable length of time.

If it is desired to produce phosphorescent compositions in accordance with the second example, which may have still greater intensity or variations in color under ultra-violet light, various compositions in minute quantity may be added to the reaction mixture. In accordance with my method to form a strongly phosphorescent composition, I may use the relative proportional amounts below defined:

| | Parts |
|---|---|
| Zinc oxide | 81 |
| Sulphur | 48 |
| Sodium chloride | 1 |
| Sodium sulphate | 1 |
| Copper chloride | .004 |

In this mixture the sodium chloride and sulphate are fluxes, whereas the copper chloride is an activator. The temperature range of ignition is between 1200° and 1250° C. and the time of ignition is between 25 and 30 minutes. The end product formed by this reaction is pale yellow in color when viewed under visible light and emits a deep green phosphorescence after exposure to ultra-violet or visible light, and this composition has an after-emissivity of a considerable time period.

With respect to the third example herein, I may add minute quantities of reagents such as barium or strontium salts for modifying the color effect of the phosphorescent end product, or I may add minute quantities of rare earth salts for causing increase in intensity of the resulting phosphorescent end product; further, I may add to the zinc oxide-sulphur reaction mixture a relatively small amount of various oxides in order to introduce in addition to the zinc oxide additional occluding substances of greater dispersible power in to the lattices of the end product crystal being developed.

It is obvious that various changes and modifications may be made to the details without departing from the general spirit of the invention as set forth in the appended claims.

I claim:

1. The process of producing a luminescent composition comprising igniting zinc oxide and sulphur in stoichiometric proportions in a non-oxidizing atmosphere and at a temperature between 1100° C. and 1350° C. to form as an end product crystals of zinc sulphide carrying zinc oxide in solid solution.

2. The process of producing a luminescent composition comprising igniting zinc oxide and sulphur in stoichiometric proportions at a temperature between 1100° and 1350° C., and for a period of one-quarter of an hour to an hour, the end product being a crystal of zinc sulphide carrying zinc oxide in solid solution and having the properties of fluorescence to phosphorescence respectively as the temperature and time increase from the lower to the higher ranges.

3. A method of producing a luminescent composition, comprising igniting zinc oxide and sulphur in stoichiometric proportions at temperatures between 1100° C. and 1350° C. and for at least one-fourth hour to develop in the zinc sulphide crystal formed during calcination, lattice distortions beyond the normal lattice distortions of ignited zinc sulphide.

4. A luminescent composition formed through ignition of zinc oxide and sulphur and consisting of only zinc sulphide crystals incorporating zinc oxide in solid solution.

5. As a product formed through ignition of stoichiometric proportions of zinc oxide and sulphur, a luminescent composition comprising only crystals of zinc sulphide having occluded therein zinc oxide in solid solution.

MAC GOODMAN.